(12) United States Patent
Hansen (10) Patent No.: US 11,811,226 B1
(45) Date of Patent: Nov. 7, 2023

(54) DIGITAL VOLTAGE DISTRIBUTOR FOR DIELECTRIC ACTUATORS

(71) Applicant: The United States of America as represented by the Secretary of the Navy, Newport, RI (US)

(72) Inventor: Thomas E Hansen, Newport, RI (US)

(73) Assignee: THE UNITED STATES OF AMERICA AS REPRESENTED BY THE SECRETARY OF THE NAVY

( * ) Notice: Subject to any disclaimer, the term of this patent is extended or adjusted under 35 U.S.C. 154(b) by 401 days.

(21) Appl. No.: 17/330,452

(22) Filed: May 26, 2021

Related U.S. Application Data (60) Provisional application No. 63/033,983, filed on Jun. 3, 2020.

(51) Int. Cl.
| | |
|---|---|
| *H02J 13/00* | (2006.01) |
| *H02J 1/00* | (2006.01) |
| *H02J 7/14* | (2006.01) |
| *H02J 15/00* | (2006.01) |

(52) U.S. Cl.
CPC .......... *H02J 13/00036* (2020.01); *H02J 1/00* (2013.01); *H02J 7/1438* (2013.01); *H02J 15/00* (2013.01)

(58) Field of Classification Search
CPC .............................. H02J 13/00036; H02J 1/00
USPC ......................................................... 307/116
See application file for complete search history.

(56) References Cited

U.S. PATENT DOCUMENTS

| | | | |
|---|---|---|---|
| 2011/0065161 A1* | 3/2011 | Kwasinski | C02F 1/008 426/237 |
| 2020/0032822 A1 | 1/2020 | Keplinger et al. | |
| 2021/0003149 A1 | 1/2021 | Keplinger et al. | |

* cited by examiner

*Primary Examiner* — Daniel Kessie
*Assistant Examiner* — Dru M Parries
(74) *Attorney, Agent, or Firm* — James M. Kasischke; Michael P. Stanley; Jeffry C. Severson (57) ABSTRACT

A four-stage digital voltage distribution system is provided with a multi-bridge relay assembly to deliver pulsed direct current to a dielectric actuator. A first stage of operation opens a forward voltage flow from a high voltage source through a passive signal conditioner before activating the actuator and passing through a forward diode to ground. A second stage cuts off the forward voltage flow to the dielectric actuator; thereby, shorting the dielectric actuator and causing a reverse discharge flow through a reverse diode. A third stage opens a reverse voltage flow through the signal conditioner before activating the dielectric actuator and passing through the reverse diode to ground. A fourth stage cuts off the reverse voltage flow to the charged dielectric actuator; thereby, shorting the dielectric actuator and causing a forward discharge flow through the forward diode. The four stages continuously loop to deliver pulsed DC to the actuator.

10 Claims, 10 Drawing Sheets

DIGITAL VOLTAGE DISTRIBUTOR FOR DIELECTRIC ACTUATORS

The present application claims the benefit of U.S. Provisional Patent Application 63/033,983 filed on Jun. 3, 2020 and entitled "Digital Voltage Distributer for Dielectric Actuators" by the inventor, Thomas Hansen.

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER APPLICATIONS

None.

BACKGROUND OF THE INVENTION

1) Field of the Invention

The present invention relates generally to power distribution technology and more particularly to a device for distributing pulsed direct current to a biology-inspired electric actuation system.

2) Description of the Related Art

Actuation is essential to the proper functioning of robotic propulsion solutions. Consequently, significant research is ongoing in the field of controlled motion. For example, propulsion design approaches mimic biological actuation (e.g., force production from muscle-like structures assembled into multi-scale ensembles with integrated control systems) to achieve improvements in power delivery, sca-lability, and efficiency. Dielectric actuator design is a focus of this ongoing research.

Known dielectric actuator designs commonly employ a dielectric material positioned between electrodes that connect to a circuit. By applying a voltage to the electrodes, the resultant electrostatic pressure mechanically deforms the dielectric material in a predetermined direction. The dielectric material returns to an original form when the circuit shorts. Dielectric actuation is an area of research interest for soft robotic systems.

Soft robotic systems exploit the characteristics of highly compliant materials similar to those found in living organisms to construct and operate robots. However, such systems are typically limited by the known soft actuators that power them. Soft actuators that employ pneumatics or shape-memory alloys exhibit shortcomings in terms of efficiency, responsiveness, and portability. Electrically powered and controlled dielectric elastomer actuators deliver muscle-like actuation but typically require complex stacks or structures to achieve linear contraction.

One class of known soft electrohydraulic transducers, known as hydraulically amplified self-healing electrostatic actuators; employ electrostatic and hydraulic principles to linearly contract on application of voltage. An exemplary actuator may comprise a rectangular pouch made from a flexible polymer shell in which the pouch is filled with a liquid dielectric.

Electrodes placed over a portion of the pouch on either side receive a voltage from a supply circuit. In response, electrostatic forces displace the liquid dielectric, causing the electrodes to progressively close and force fluid into uncovered portions of the pouch. The resultant transition from a flat cross section to a more circular one leads to a contractile force. Embodiments of the Peano-HASL design have shown promise for applications such as autonomous robotic devices, active prostheses, and automation.

Some of the unique challenges of distributing power to the above-described actuators include, ensuring the delivered voltage is bipolar which often requires employment of large amplifiers, switcher and pulser units. Such voltage delivery is not typically suited for high voltage.

Certain known devices provide compact high voltage arbitrary wave forms at small scales, or linear high voltage DC-DC converters. However, known designs for, such devices currently lack the unique combination of power, voltage ramp rate, form factor, and digital controllability needed for the operation of large dielectric actuator-based robots.

As such, a need exists for a solution to at least one of the aforementioned challenges in the delivery of pulsed direct current (DC) from a high voltage source to a bipolar electrical load. For instance, a need exists for improvements in power distribution particular to the needs of dielectric actuators in robots.

BRIEF SUMMARY OF THE INVENTION

Accordingly, it is a primary object and general purpose of the present invention to provide a digital voltage distribution system and associated methods for transmitting pulsed direct current (DC) from a high voltage source to a ground through a bipolar electrical load. The electrical load is a dielectric actuator characterized by a first pole and a second pole through which voltage passes in either direction.

The digital voltage distribution system generally includes a multi-relay H-bridge assembly with a source side forward relay and a ground side forward relay configured such that a forward output of the source side forward relay electrically connects with a first pole of the dielectric actuator. A forward input of the ground side forward relay electrically connects with a second pole of the dielectric actuator through a ground side forward passive conditioning loop.

A multi-relay bridge assembly has a source side reverse relay and a ground side reverse relay configured such that a reverse output of the source side reverse relay electrically connects with the second pole of the dielectric actuator. A reverse input of the ground side reverse relay electrically connects with the first pole of the dielectric actuator through a ground side reverse passive conditioning loop.

A forward loop input of the ground side forward passive conditioning loop electrically connects with the second pole of the dielectric actuator. A forward input of the ground side forward relay electrically connects with a forward loop output of the ground side forward passive conditioning loop. Similarly, a reverse loop input of the ground side reverse passive conditioning loop electrically connects with the first pole of the dielectric actuator and a reverse input of the ground side reverse relay electrically connects with a reverse loop output of the ground side reverse passive conditioning loop.

The ground side forward passive conditioning loop is a ground side forward diode and a ground side forward resistor. The resistor is for current control; however, the resister could be a more complex circuit capable of the precisely conditioning the current. The circuit may have resister-capacitor components as well as other integrated circuits.

A forward diode input of the ground side forward diode electrically connects with a forward resistor output of the ground side forward resistor to define the forward loop input of the ground side forward passive conditioning loop. A forward diode output of the ground side forward diode electrically connects with a forward resistor input of the ground side forward resistor to define the forward loop output of the ground side forward passive conditioning loop.

The ground side reverse passive conditioning loop has a ground side reverse diode and a ground side reverse resistor. A reverse diode input of the ground side reverse diode electrically connects with a reverse resistor output of the ground side reverse resistor to define the reverse loop input of the ground side reverse passive conditioning loop. A reverse diode output of the ground side reverse diode electrically connects with a reverse resistor input of the ground side reverse resistor to define the reverse loop output of the ground side reverse passive conditioning loop.

A forward output of the ground side forward relay and/or a reverse output of the ground side reverse relay electrically connects with the ground using a shared ground line. A forward input of the source side forward relay and/or a reverse input of the source side reverse relay electrically connects with the high voltage source using a shared voltage input line which includes an input passive conditioning element.

These and other objects, features, and advantages of the present invention will become more readily apparent from the attached drawings and the detailed description of the invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Figure 1:
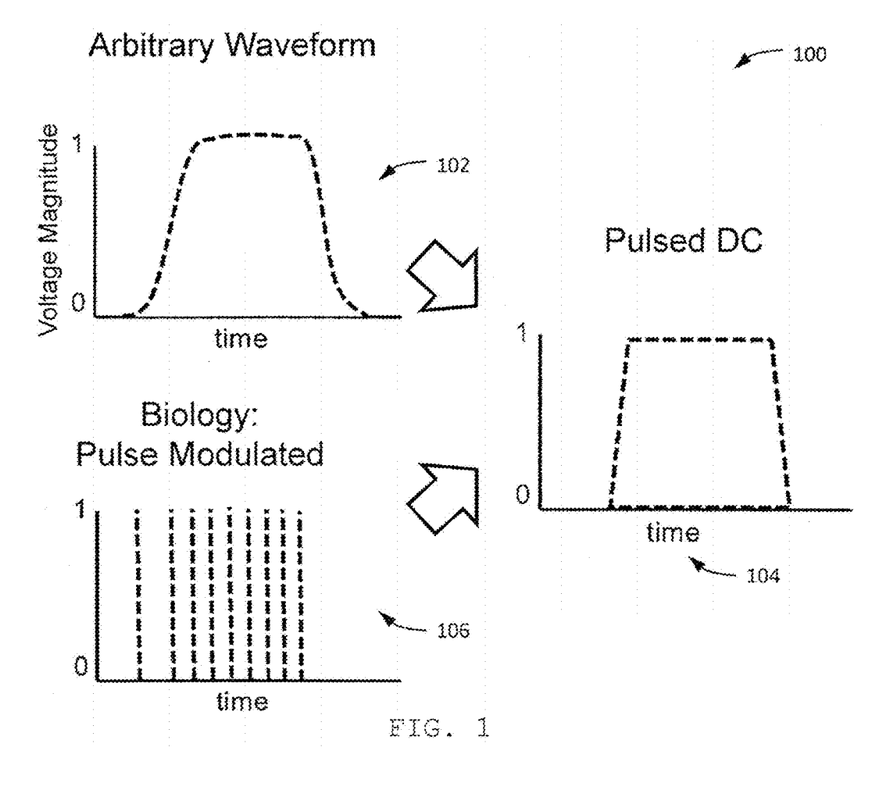
FIG. 1 depicts a graph differentiating pulsed direct current (DC) simulation by arbitrary waveform versus biology-inspired pulse modulation of the present invention.

Referring initially to the power simulation comparisons 100 of FIG. 1, varying approaches to delivering a pulsed direct current (DC) waveform 104 are shown. In the figure, the pulsed DC form 104 exhibits alternating current and direct current. Similar to an AC wave, the voltage of a pulsed DC wave continually varies (typically between On and Off); but like a DC wave, the sign of the voltage remains relatively constant. Furthermore, the polarity of the transmitted current does not change for pulsed DC. Instead, pulsed DC maintains a single polarity throughout transmission. As used herein, pulsed DC describes a signal of one or more rectangular ("flat-topped") pulses 104, rather than sinusoidal pulses.

Arbitrary wave forms 102 simulate pulsed DC by employing either a half-wave or full-wave rectifier to produce the pulses 104. However, this rectification requires a control level that results in pulsed DC distribution implementations that are more complex; that consume more driving power; and/or that require larger form factors.

Biology inspired systems are an alternative to arbitrary waveforms for simulating pulsed DC. By using stored energy using low power, a number of comparatively simple electronic actuators (e.g., "muscles") are activated by one or more applied currents turned "On or Off" to collectively produce a flat-topped pulse signal 106. The applied currents, also referred to as a pulsed DC gate, flow from a high voltage supply to the electronic actuators such that wave shape and power are determined by passive conditioning.

Passive conditioning refers' to components such as resistors, transformers, and diodes that do not use an external power source. Resistors impede the flow of electrons without introducing more electricity into the host system and diodes allow the flow of current in only one direction without introducing more electricity into the host system.

The digital voltage distribution introduces a high voltage (HV) power distributor for dielectric actuators (DA) that cycle four-stage, digitally controlled relay circuits such alternating bi-polar pulsed direct current (DC) output cycles between each pulse. A multi-relay bridge assembly of the digital voltage distribution technology employs relays, diodes, and passive components to receive input power from high voltage sources. Relays are electromechanical and may be replaced in a another version of this invention by transistors or similar "gate" components. The multi-relay bridge assembly also generates bi-polar output power for a dielectric actuator. The bridge assembly recovers energy discharged from a dielectric actuator.

Figure 2:
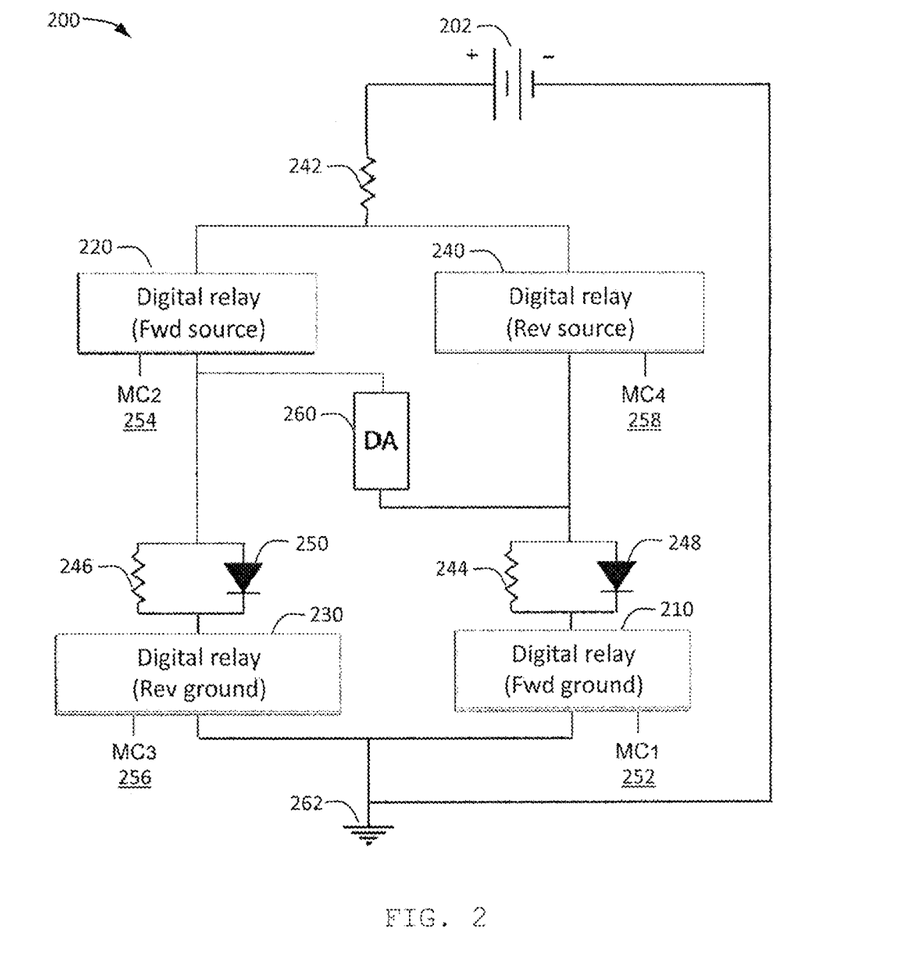
FIG. 2 depicts a schematic diagram of a digital voltage distribution system of the present invention.

In FIG. 2, a digital voltage distribution system 200 delivers a direct current (DC) voltage to a bipolar electrical load such as a dielectric actuator. The digital voltage distribution system 200 includes a high voltage source 202 in electrical communication with relays 210, 220, 230, and 240; a passive signal conditioning component 242 for incoming voltage; passive signal conditioning components 244, 246 for outgoing voltage and diodes 248, 250 for dielectric discharging. Passive and active components for signal conditioning may be used in more sophisticated versions.

Each of the relays 210, 220, 230, 240 include a respective control interface 252, 254, 256, 258 (e.g., microcontroller input pin) through which a digital controller (not shown) operates the voltage distribution system 200. A person ordinarily skilled in the art will recognize how the relay operation commands are input to the voltage distribution system 200.

The high voltage source(s) 202 is set to a desired voltage and remains at that voltage for energy storage that may change during operation. Electrical characteristics such as voltage ramp speed and conditioning are achieved by using the passive components 242, 244, 246. The high voltage source 202 is a DC source designed for capacitive loads, such as a dielectric actuator 260. In one embodiment, the high voltage source 202 is a 24V-DC input that operates on 24V battery power to drive the voltage distribution system 200.

Although the digital voltage distribution system 200 electrically connects via a common ground 262; the negative polarity may not be a true sink but instead represents the electrical charge effect sensed by the dielectric actuator 260. The experience of the dielectric actuator 260 may be a bipolar waveform. However, only a single constant high voltage supply is provided by the source 202 that routes in reverse throughout each cycle. The high voltage supply itself does not turn on and off but instead constantly maintains a reservoir of charge.

Components in the present invention are referenced by the position of the component within a voltage path with respect to the bipolar electrical load being served and/or a primary direction of the voltage path through that component. For example: the relays 210, 220, 230 and 240 are referred to as the ground side forward relay 210, the source side forward relay 220, the ground side reverse relay 230, and the source side reverse relay 240.

Similarly, features of the components in the present invention are referenced by the direction of the voltage path through that component and the name of the component itself. For example: digital control inputs and outputs for the ground side forward relay 210 are referred to as a forward input and a forward output (as shown in FIG. 3) and digital control inputs and outputs for the source side reverse relay 240 are referred to as a reverse input and a reverse output.

Figure 3:
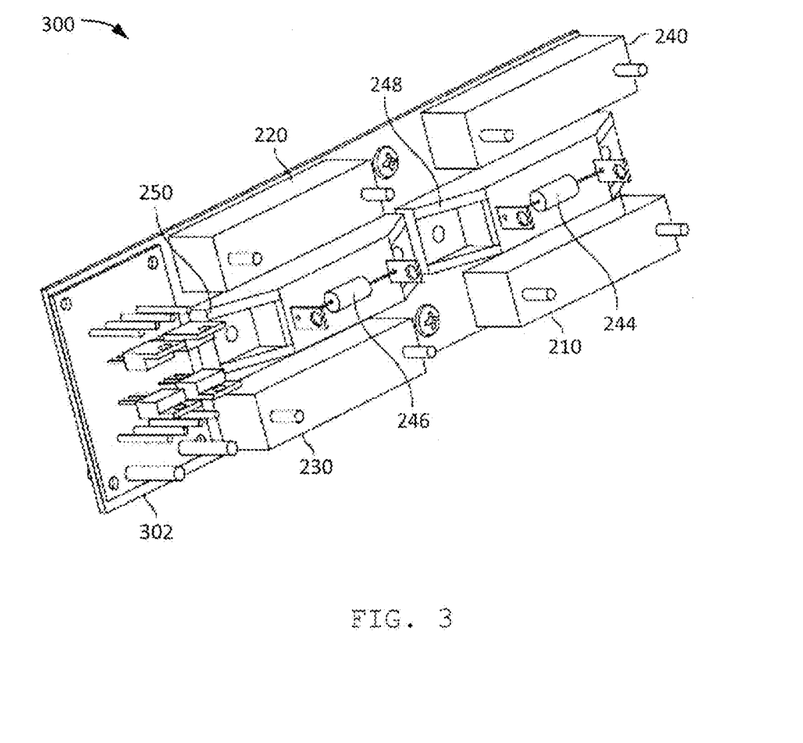
FIG. 3 depicts a top perspective view of a multi-relay bridge assembly of a digital voltage distribution system as mounted on an exemplary circuit board of the present invention.

In FIG. 3, and continuing to refer to FIG. 2, a multi-relay bridge 300 of the digital voltage distribution system 200 includes a circuit board 302 that mounts the source side forward relay 220, the ground side forward relay 210, the source side reverse relay 240 and the ground side reverse relay 230. Also, the ground side forward-diode 248, the ground side forward resistor 244, the ground side reverse diode 250, and the ground side reverse resistor 246 affix to the circuit board 302.

Figure 4:
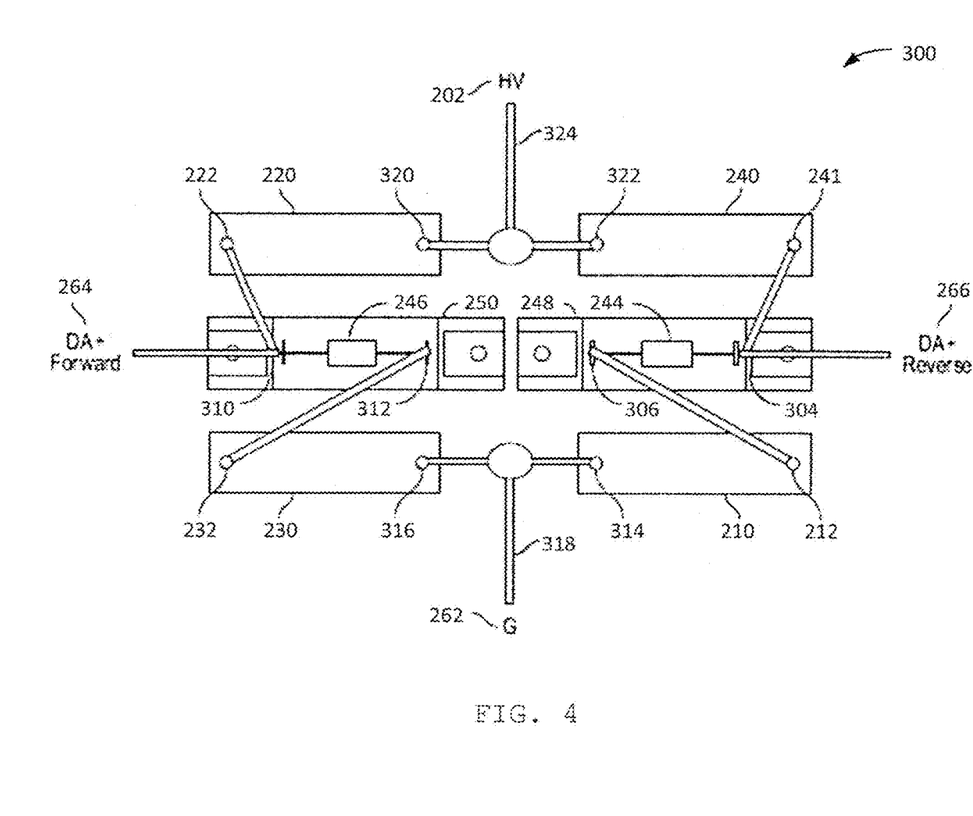
FIG. 4 depicts a top view of the multi-relay bridge assembly of FIG. 3 overlayed with a schematic diagram of wiring topology for the digital voltage distribution system.
Figure 5:
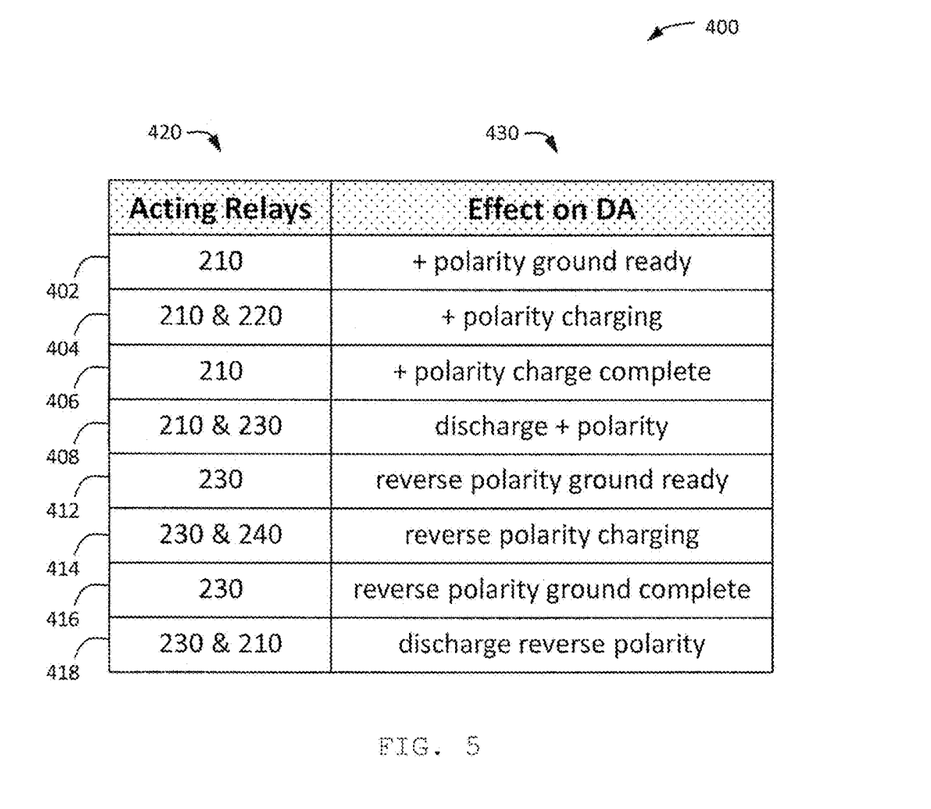
FIG. 5 depicts a table of operating states of the digital voltage distribution system.

In FIG. 4 and continuing to refer to FIG. 2 and FIG. 3, the multi-relay bridge 300 includes a forward output 222 of the source side forward relay 220 electrically connected with a first pole 264 of the dielectric actuator 260. A forward input 212 of the ground side forward relay control 210 connects with a second pole 266 of the dielectric actuator 260 through a ground side forward passive conditioning loop.

The ground side forward passive conditioning loop includes the ground side forward diode 248 and the ground side forward resistor 244. Also, a reverse output 241 of the source side reverse relay 240 electrically connects with the second pole 266 of the dielectric actuator 260. A reverse input 232 of the ground side reverse relay 230 electrically connects with the first pole 264 of the dielectric actuator 260 through a ground side reverse passive conditioning loop that has the ground side reverse diode 250 and the ground side reverse resistor 246.

Electrically mounting a forward resistor output of the ground side forward resistor 244- to a forward diode input of the ground side forward diode 248 defines a forward loop input 304 of the ground side forward passive conditioning loop. Similarly, electrically mounting a forward resistor input of the ground side forward resistor 244 to a forward diode output of the ground side forward diode 248 defines a forward loop output 306 of the ground side forward passive conditioning loop. The forward loop input 304 of the ground side forward passive conditioning loop electrically connects with the second pole 266 of the dielectric actuator 260, and the forward input 212 of the ground side forward relay 210 electrically connects with the forward loop output 306 of the ground side forward passive conditioning loop.

Similarly, electrically mounting a reverse resistor output of the ground side reverse resistor 246 to a reverse diode input of the ground side reverse diode 250 defines a reverse loop input 310 of the ground side reverse passive conditioning loop. Additionally, electrically mounting a reverse resistor input of the ground side reverse resistor 246 to a reverse diode output of the ground side reverse diode 250 defines a reverse loop output 312 of the ground side reverse passive conditioning loop.

The reverse loop input 310 electrically connects with the first pole 264 and the reverse input 246 electrically connects with the reverse loop output 312 of the ground side reverse passive conditioning loop. A forward output 314 of the ground side forward relay 210 and/or a reverse output 316 of the ground side reverse relay 230 electrically connect with the ground 262 using a shared ground line 318. Additionally, a forward input 320 of the source side forward relay 220 and/or a reverse input 322 of the source side reverse relay 240 electrically connect with the high voltage source 202 using a shared voltage input line 324 which includes an input passive conditioning element 242.

Referring now to FIG. 5, FIG. 6, FIG. 7, FIG. 8, and FIG. 9, a method of operating the digital voltage distribution system 200 is described. The method steps 400 operate the digital voltage distribution system 200 as a cycling four-stage, digitally controlled relay circuit that produces an alternating bipolar pulse output with discharge cycles between each pulse.

Figure 6:
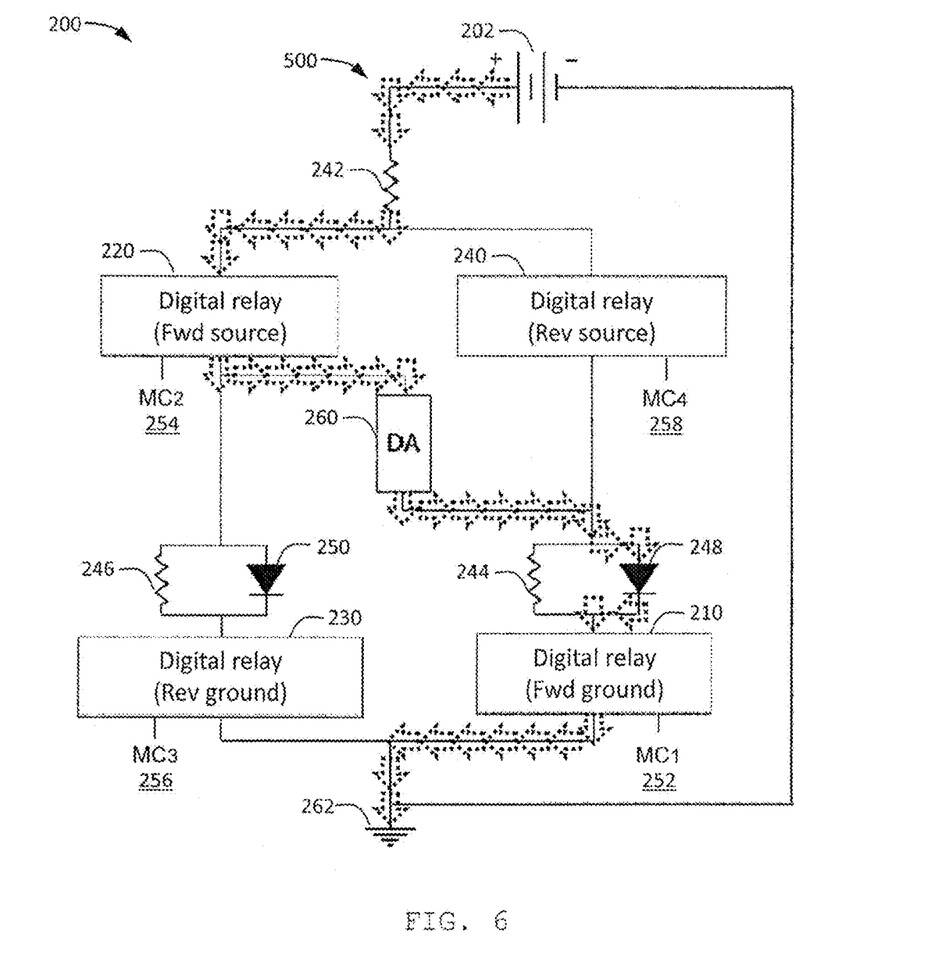
FIG. 6 depicts a first schematic diagram of the operating states of FIG. 5 as generated through the digital voltage distribution system of the present invention.

In the first stage of operation, the microcontroller input control interface (MC1) 252 operates the relay control 210 to open to the ground 262 at step 402 before the microcontroller input control interface (MC2) 254 operates the relay control 220 to open at step 404. As shown in FIG. 6, in response to opening this circuit, voltage flow 500 experiences passive signal conditioning 242 before activating (e.g., "contracting") the dielectric actuator 260 and passing through the diode 248 to the ground 262.

Figure 7:
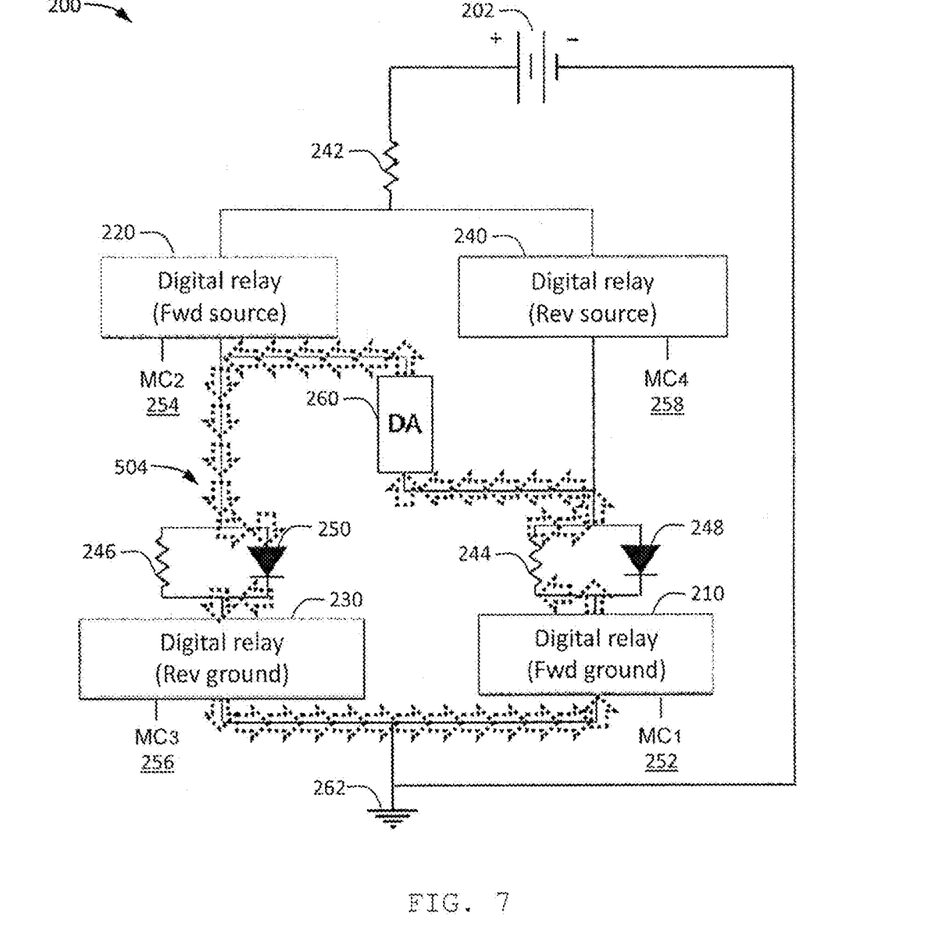
FIG. 7 depicts a second schematic diagram of the operating states of FIG. 5 as generated through the digital voltage distribution system of the present invention.

In the second stage of operation, the microcontroller input control interface (MC2) 254 operates the relay 220 to close at step 406; thereby, cutting off the flow of power from the high voltage source 202 to the dielectric actuator 260. At this point, the dielectric actuator 260 is charged and the relay control 210 remains open. At step 408, microcontroller input control interface (MC3) 256 opens the relay control 230, which results in shorting the dielectric actuator 260. As a matter of definition, shorting refers to removing a flow of electricity from a given circuit and to moving any resulting discharge of energy outside of that circuit. As shown in FIG.

7, discharge of the dielectric actuator 260 reverses flow 504 through the diode 250 and the passive signal conditioner 244.

Figure 8:
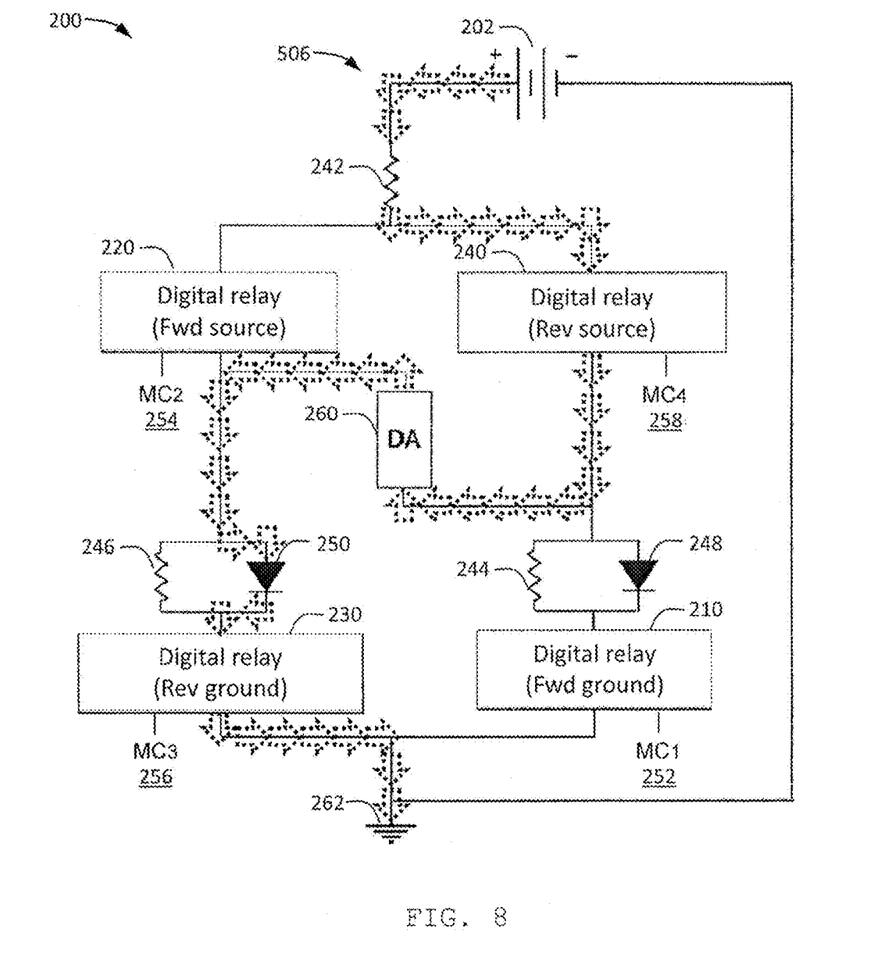
FIG. 8 depicts a third schematic diagram of the operating states of FIG. 5 as generated through the digital voltage distribution system of the present invention.

In the third stage of operation, microcontroller input control interface (MC3) 256 operates the relay control 230 to open to the ground 262 at step 412 before the microcontroller input control interface (MC4) 258 operates the relay control 240 to open at step 414. As shown in FIG. 8, in response to opening this reverse polarity circuit, voltage flow 506 undergoes passive signal conditioning 242 before clenching the dielectric actuator 260 and passing through the diode 250 to the ground 262.

Figure 9:
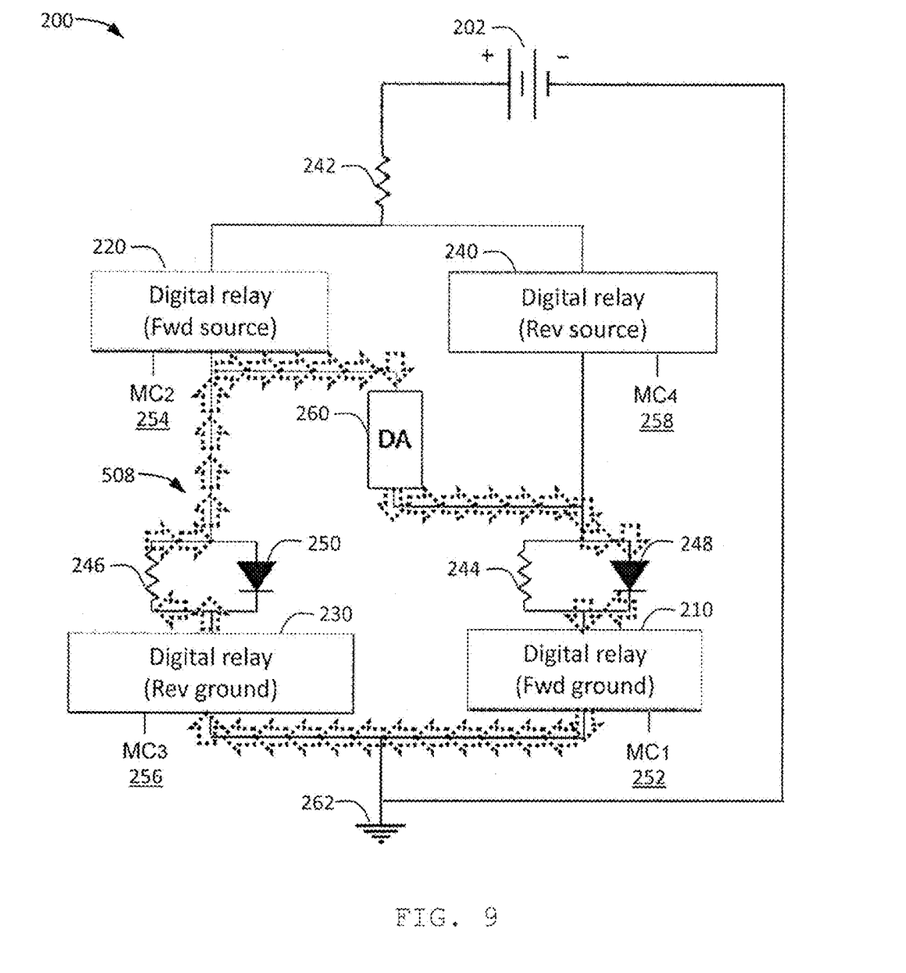
FIG. 9 depicts a fourth schematic diagram of the operating states of FIG. 5 as generated through the digital voltage distribution system of the present invention.

In the fourth stage of operation, microcontroller input control interface (MC4) 258 operates the relay control 240 to close at step 416; thereby, cutting off flow of power from the high voltage source 202 to the dielectric actuator 260. At this point, the dielectric actuator 260 is charged and the relay control 230 remains open. At step 418, the microcontroller input control interface (MC1) 252 opens the relay control 210 with the result of shorting the dielectric actuator 260.

As shown in FIG. 9, discharge of the dielectric actuator 260 forwards flow 508 through the diode 248 and the passive signal conditioner 246. The digital voltage distribution system 200 returns to the first stage of operation by employing the microcontroller input control interface (MC2) 254 to operate the relay control 220 to open. In the manner described, the four stages of the digitally controlled distribution system 200 continuously cycle to deliver high voltage to the connected bipolar dielectric actuator 260.

Referring again to FIG. 5, FIG. 6, FIG. 7, FIG. 8, and FIG. 9, a method of operating the digital voltage distribution system 200 as illustrated in FIG. 4 is described. The method steps 400 operate the digital voltage distribution system 200 to transmit pulsed direct current from the voltage source 202 to the ground 262 through the dielectric actuator 260 employing a repeated progression through alternating pulse and discharge stages.

For example, the operating method 400 may comprise a first pulse stage characterized by opening the ground side forward relay 210 and the source side forward relay 220 to define the forward voltage path 500 from the high voltage source 202 to the ground 262 through the source side forward relay 220, the dielectric actuator 260 from the first pole 264 to the second pole 266, the ground side forward diode 248, and the ground side forward relay 210.

Also, the operating method 400 may comprise a first discharge stage by closing the source side forward relay 220 and opening the ground side reverse relay 230 to short the forward voltage path 500 and to define a reverse discharge loop 504 through the ground side reverse diode 250, the ground side reverse relay 230, the ground side forward relay 210, the ground side forward resistor 244 and the dielectric actuator 260 from the second pole 266 to the first pole 264.

Also, the operating method 400 may comprise a second pulse stage characterized by opening the ground side reverse relay 230 and the source side reverse relay 240 to define the reverse voltage path 506 from the high voltage source 202 to the ground 262 through the source side reverse relay 240, the dielectric actuator 260 in a reverse direction defined from the second pole 266 to the first pole 264, the ground side reverse diode 250 and the ground side reverse relay 230.

Also, the operating method 400 may comprise a second discharge stage characterized by closing the source side reverse relay 240 and opening the ground side forward relay 210 to short the reverse voltage path 506 and to define a forward discharge loop 508 through the ground side forward diode 248, the ground side forward relay 210, the ground side reverse relay 230, the ground side reverse resistor 246, and the dielectric actuator 260 from the first pole 264 to the second pole 266.

Figure 10:
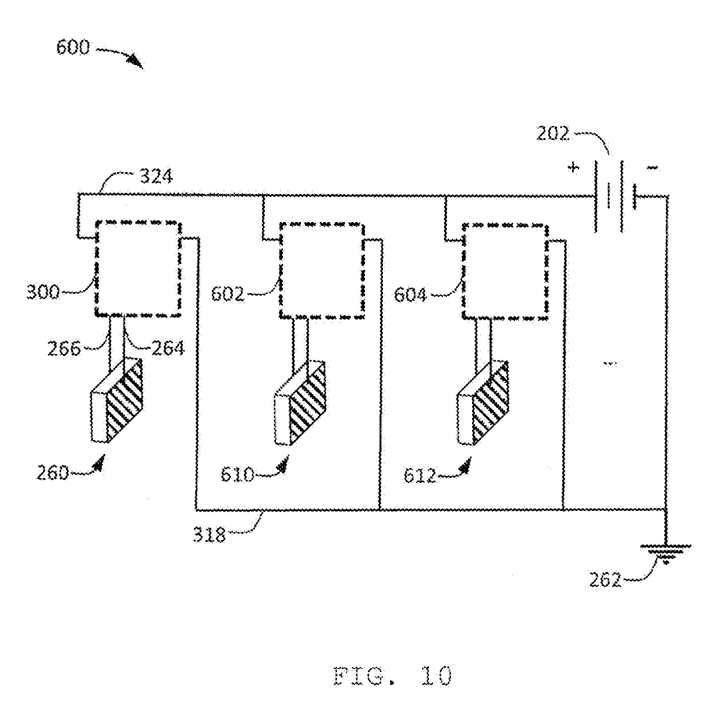
FIG. 10 depicts a schematic diagram of a digital voltage distribution system comprising a plurality of multi-relay bridge assemblies of the present invention.

Referring to FIG. 10, the present invention may have multiple multi-relay bridges with each powered by a shared high voltage source. A multi-channel digital voltage distributor 600 includes the multi-relay bridge 300 electrically connected to the input high voltage source 202, the ground 262 or common return. The ground 262 does not have to be an earth ground. The multi-channel digital voltage distributor 600 delivers pulsed DC to the first pole 264 and the second pole 266 of the dielectric actuator 260.

In addition, the voltage source 202 may simultaneously deliver pulsed DC to multi-relay bridges 602, 604 which electrically connect to the ground 262. Depending on the application requirements, the circuitry of multi-relay bridges 602, 604 mirror the multi-relay bridge 300. One or both bridges 602, 604 may comprise alternative, fewer, or additional passive components (e.g., resistors, diodes) configured to tailor the operation of the respective dielectric actuators 610, 612.

Alternative embodiments of the present invention may include one or more of the following options:

A) The multi-relay bridge assembly includes a charge recovery circuit to recover energy released during discharge from the dielectric actuator. Charge recovery may include one or more of a capacitor or battery bank, a DC-DC switched-mode power supply, and a Buck converter;

B) Some or all components of the digital voltage distribution system comprise Pressure Tolerant Electronics (PTE) or some combination of PTE and/or non-PTE sections. In certain PTE-enhanced embodiments, circuitry employed for charging and discharging dielectic actuators is tolerant to deep ocean depths and pressures.

C) Embodiments of a digital voltage distribution system may be fully or partially submerged in one or more fluids such as oil or water for cooling purposes and/or to ensure uniform atmospheric or hydrostatic pressure.

D) Embodiments of a digital voltage distribution system may be fully or partially submerged in one or more encapsulants such as epoxy and/or pressure resilient vessels such as a metal shell to ensure isolation from the exterior environment.

E) Embodiments of a digital voltage distribution system may be fully or partially housed in one or more Electromagnetic Interference (EMI) isolating cages to prevent propagation of EMI into or out of the circuitry.

F) The digital voltage distribution system may employ a differing number of relays per multi-relay bridge to generate alternative, special-purpose polarity and/or voltage pulses and/or waveforms. For example, three relays may be employed to build a unipolar system, or six (6) relays may be employed to build a dual-voltage system.

G) Embodiments of a digital voltage distribution system may employ a respective "flyback" diode on one or more of the relays onboard the multi-relay bridge to reduce back electromagnetic fields (EMF) caused by relay coil inductance.

The system and associated methods of the present invention cycle power to operate dielectric actuators in robotic devices where space is limited, efficiency is important, scalability to many actuator channels is desired, and fast power delivery in large quantities is required.

The digital voltage distribution system offers efficiency (e.g., power not required to discharge circuit), delivers high power at faster rates (due at least in part to pulses versus ramps), may require less space and/or may be less expensive, may accommodate multiple channels, and may offer higher currents more efficiently.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A multi-relay bridge assembly for pulsed direct current transmission from a high voltage source to a ground through a bipolar electrical load having a first pole and a second pole, said multi-relay bridge assembly comprising:

a source side forward relay and a ground side forward relay wherein a forward output of said source side forward relay is directly connected to said first pole of said bipolar electrical load and a forward input of said ground side forward relay is directly connected to said second pole of said bipolar electrical load;

a source side reverse relay and a ground side reverse relay wherein a reverse output of said source side reverse relay is directly connected to said second pole of said bipolar electrical load and a reverse input of said ground side reverse relay is directly connected to said first pole of said bipolar electrical load, a ground side forward diode having a forward diode input directly connected to said second pole of said bipolar electrical load and a forward diode output directly connected to said forward input of said ground side forward relay;

a ground side forward resistor having a forward resistor output directly connected to said forward diode input of said ground side forward diode and a forward resistor input directly connected to said forward diode output of said ground side forward diode;

a ground side reverse diode having a reverse diode input directly connected to said first pole of said bipolar electrical load and a reverse diode output directly connected to said reverse input of said ground side reverse relay; and a ground side reverse resistor having a reverse resistor output directly connected to said reverse diode input of said ground side reverse diode and a reverse resistor input directly connected to said reverse diode output of said ground side reverse diode.

2. The multi-relay bridge assembly in accordance with claim 1, wherein said ground side forward relay further comprises a forward output in electrical communication with said ground; and said source side forward relay further comprises a forward input in electrical communication with said high voltage source wherein said ground side forward relay and said source side forward relay are configured to r open in order to define a forward voltage path from said high voltage source to said ground through said source side forward relay, from said first pole to said second pole of said bipolar electrical load, said ground side forward diode and said ground side forward relay.

3. The multi-relay bridge assembly in accordance with claim 2, wherein said source side forward relay is configured to close and said ground side reverse relay is configured to open in order to short said forward voltage path and to receive a first discharge from said first pole into a reverse discharge loop defined through said ground side reverse diode, said ground side reverse relay, said ground side forward relay, said ground side forward resistor and from said second pole to said first pole of said bipolar electrical load.

4. The multi-relay bridge assembly in accordance with claim 3, wherein said ground side reverse relay further comprises a reverse output in electrical communication with said ground; and said source side reverse relay further comprises a reverse input in electrical communication with said high voltage source wherein said ground side reverse relay and said source side reverse relay are configured to open in order to define a reverse voltage path from said high voltage source to said ground through said source side reverse relay, in a reverse direction defined from said second pole to said first pole of said bipolar electrical load, said ground side reverse diode and said ground side reverse relay.

5. The multi-relay bridge assembly in accordance with claim 4, wherein said source side reverse relay is configured to close and said ground side forward relay is configured to open in order to short said reverse voltage path and to receive a second discharge from said second pole into a forward discharge loop defined through said ground side forward diode, said ground side forward relay, said ground side reverse relay, said ground side reverse resistor and said bipolar electrical load from said first pole to said second pole of said bipolar electrical load.

6. The multi-relay bridge assembly in accordance with claim 5, wherein said bipolar electrical load is a dielectric actuator.

7. A method of operating a digital voltage distribution system to transmit pulsed current from a high voltage source to a ground through a bipolar electrical load having a first pole and a second pole, said method comprising the steps of:

electrically connecting a source side forward relay, a ground side forward relay, a ground side forward passive conditioning loop including a ground side forward diode and a ground side forward resistor wherein a forward diode input of said ground side forward diode is in electrical communication with a forward resistor output of said ground side forward resistor to define a forward loop input of said ground side forward passive conditioning loop and wherein a forward diode output of said ground side forward diode is in electrical communication with a forward resistor input of said ground side forward resistor to define a forward loop output of said ground side forward passive conditioning loop;

electrically connecting a source side reverse relay, and ground side reverse relay, a ground side reverse passive conditioning loop including a ground side reverse diode and a ground side reverse resistor wherein a reverse diode input of said ground side reverse diode is in electrical communication with a reverse resistor output of said ground side reverse resistor to define a reverse loop input of said ground side reverse passive conditioning loop and wherein a reverse diode output of said ground side reverse diode is in electrical communication with a reverse resistor input of said ground side reverse resistor to define a reverse loop output of said ground side reverse passive conditioning loop;

wherein a forward output of said source side forward relay is in electrical communication with said first pole of said bipolar electrical load;

wherein said forward loop input of said ground side forward passive conditioning loop is in electrical communication with said second pole of said bipolar electrical load;

wherein a forward input of said ground side forward relay is in electrical communication with said forward loop output of said ground side forward passive conditioning loop;

wherein a reverse output of said source side reverse relay is in electrical communication with said second pole of said bipolar electrical load;

wherein said reverse loop input of said ground side reverse passive conditioning loop is in electrical communication with said first pole of said bipolar electrical load;

wherein a reverse input of said ground side reverse relay is in electrical communication with said reverse loop output of said ground side reverse passive conditioning loop;

wherein a forward output of said ground side forward relay and a reverse output of said ground side reverse relay are in electrical communication with said ground;

wherein a forward input of said source side forward relay and a reverse input of said source side reverse relay is in electrical communication with said high voltage source;

opening said ground side forward relay and said source side forward relay; and defining a forward voltage path from said high voltage source to said ground through said source side forward relay, said bipolar electrical load from said first pole to said second pole, said ground side forward diode, and said ground side forward relay.

8. The method in accordance with claim 7, said method further comprising the steps of:

closing said source side forward relay;

opening said ground side reverse relay;

shorting said forward voltage path; and defining a reverse discharge loop through said ground side reverse diode, said ground side reverse relay, said ground side forward relay, said ground side forward resistor and said bipolar electrical load from said second pole to said first pole.

9. The method in accordance with claim 8, said method further comprising the steps of:

opening said ground side reverse relay and said source side reverse relay;

defining a reverse voltage path from said high voltage source to said ground through said source side reverse relay, said bipolar electrical load from said second pole to said first pole, said ground side reverse diode, and said ground side reverse relay.

10. The method in accordance with claim 9, said method further comprising the steps of:

closing said source side reverse relay;

opening said ground side forward relay;

shorting said reverse voltage path; and defining a forward discharge loop through said ground side forward diode, said ground side forward relay, said ground side reverse relay, said ground side reverse resistor, and said bipolar electrical load from said first pole to said second pole.

\* \* \* \* \*